US012022364B1

(12) United States Patent
Reissner

(10) Patent No.: US 12,022,364 B1
(45) Date of Patent: Jun. 25, 2024

(54) MESSAGING CAMPAIGN DRIFT DETECTION

(71) Applicant: Syniverse Technologies, LLC, Tampa, FL (US)

(72) Inventor: Guido Reissner, Udenheim (DE)

(73) Assignee: Syniverse Technologies, LLC, Tampa, FL (US)

( * ) Notice: Subject to any disclaimer, the term of this patent is extended or adjusted under 35 U.S.C. 154(b) by 0 days.

(21) Appl. No.: 18/603,457

(22) Filed: Mar. 13, 2024

(51) Int. Cl.
*H04W 4/16* (2009.01)
*H04W 4/14* (2009.01)
*G06F 9/30* (2018.01)

(52) U.S. Cl.
CPC ............... *H04W 4/16* (2013.01); *H04W 4/14* (2013.01)

(58) Field of Classification Search
CPC .................................. H04W 4/16; H04W 4/14
See application file for complete search history.

(56) References Cited

U.S. PATENT DOCUMENTS

| | | | | |
|---|---|---|---|---|
| 2008/0281581 | A1* | 11/2008 | Henshaw | G06F 16/353 704/9 |
| 2017/0078428 | A1* | 3/2017 | Unter Ecker | H04W 4/80 |
| 2021/0248322 | A1* | 8/2021 | Modani | G06F 9/30036 |

FOREIGN PATENT DOCUMENTS

WO    2021107990  A1    6/2021

OTHER PUBLICATIONS

The Campaign Registry CSP User Guide, chrome-extension://efaidnbmnnnibpcajpcglclefindmkaj/https://www.campaignregistry.com/Assets%2FTCR-CSP-User-Manual_Doc_V6.pdf, Last Accessed Apr. 16, 2024.
CSP Registry API, https://csp-api.campaignregistry.com/v2/restAPI#/, Last Accessed Feb. 22, 2024.
FAQ—Campaign Registry, https://www.campaignregistry.com/faq/, Last Accessed Feb. 22, 2024.

* cited by examiner

*Primary Examiner* — Joseph E Dean, Jr.
(74) *Attorney, Agent, or Firm* — Anton J. Hopen; Smith & Hopen, P.A.

(57) ABSTRACT

The invention provides a system and method for detecting message drift within registered message campaigns to ensure compliance with predefined use case parameters. Utilizing a messaging compliance registry (MCR), the system downloads campaign data and employs control vectors derived from sample texts, representing intended communications within specific use cases. These vectors enable real-time comparison of incoming messages against expected messaging, employing methods such as cosine similarity measures and various vectorization models. If an incoming message's vector significantly deviates from the established threshold, indicating message drift, the system can delay, quarantine, or tag the message, while notifying the MCR. The process ensures that messages adhere to their registered campaign's guidelines, enhancing regulatory compliance and content integrity across messaging platforms.

26 Claims, 9 Drawing Sheets

Fig. 8

```
import requests
import json def send_violation_notification(sms_details, mno_details):
    payload = {
        'eventType': 'SMS_USE_CASE_VIOLATION', 'cspId': 'Syniverse',
        'cnpId': sms_details['cnpId'], 'cspName': 'Syniverse Gateway',
        'brandId': sms_details['brandId'], 'brandName': sms_details['brandName'],
        'campaignId': sms_details['campaignId'], 'campaignReferenceId':
sms_details['campaignReferenceId'],
        'mnoId': mno_details['mnoId'], 'mnoName': mno_details['mnoName'],
        'description': 'Detected violation in SMS content for customer service use
case'
    }
    response = requests.post(mno_details['apiEndpoint'], headers={'Content-Type':
'application/json'}, data=json.dumps(payload))
    print('Notification sent successfully.') if response.status_code == 200 else
print(f'Failed to send notification. Status code: {response.status_code}, Message:
{response.text}')

if __name__ == '__main__':
    sms_details = {'cnpId': '12345', 'brandId': '67890', 'brandName':
'ExampleBrand', 'campaignId': 'abcde', 'campaignReferenceId': 'fghij'}
    mno_details = {'mnoId': '98765', 'mnoName': 'ExampleMNO', 'apiEndpoint':
'https://sms-api.syniverse.com/api-drift/mno/notifications'}
    send_violation_notification(sms_details, mno_details)
```

MESSAGING CAMPAIGN DRIFT DETECTION

BACKGROUND OF THE INVENTION

1. Field of the Invention

The described embodiments relate generally to telecommunications and messaging compliance systems. Specifically, the described embodiments relate to systems and methods for monitoring and enforcing compliance in Application-to-Person (A2P) messaging campaigns, including real-time analysis and comparison of message content against registered campaign parameters and message samples to prevent misuse and ensure adherence to regulatory standards.

SUMMARY OF THE INVENTION

The increasing reliance on SMS (Short Message Service) for business communications, particularly for marketing, customer service, and transactional messages, has necessitated a structured and regulated ecosystem. Campaign Service Providers (CSP) work with The Campaign Registry (TCR) to streamline the registration and management of business messaging campaigns, especially for 10-digit long code (10DLC) numbers utilized within the United States. Businesses, represented by brands, are required to register their messaging campaigns through a CSP to comply with carrier regulations and to ensure message legitimacy. This process involves the submission of campaign details, including use cases and message samples, to TCR, where they undergo cyber and identity verifications. The vetting process, integral to maintaining the integrity of SMS communications, assigns a brand one of several statuses: UNVERIFIED, VERIFIED, or VETTED_VERIFIED, each reflecting the brand's compliance and trust level.

However, despite these measures, the ecosystem faces challenges with registered SMS and MMS campaigns being abused. Businesses may diverge significantly from their registered message content or use case, leading to potential transmission of inappropriate content or financial discrepancies, given the variable fees based on campaign types. The disclosed system addresses these issues by leveraging machine learning (ML) techniques to analyze and compare incoming messages against registered campaign samples in real-time. One innovation lies in representing SMS texts messages in a high-dimensional vector space, enabling a nuanced comparison beyond mere textual analysis. By calculating the angular distance between vectors, the system can detect significant deviations from registered samples, indicating potential abuse or misclassification. Upon detection, the system categorizes the deviant message under the correct use case, if any, or flags it for review. This automated drift detection and reclassification process not only prevents the misuse of registered campaigns but also aligns actual message traffic with the appropriate fee structure, thereby ensuring fairness and compliance in the messaging ecosystem.

The present invention also anticipates detecting drift for MMS messages that contain image, audio and video content (collectively, multimedia content) by incorporating machine learning models for analyzing images, recognizing voice, sounds, music and interpreting video content. Image analysis involves object detection and scene recognition, while voice analysis includes speech-to-text algorithms and sentiment analysis. For video, both image and voice analysis techniques are combined. The invention adapts to include a high-dimensional vector space representation for multimedia content, using neural networks to convert images, audio, and video into vectors. Additionally, the system includes methods for calculating similarities between multimedia content vectors and registered campaign samples. Variations of the campaign registration process provide multimedia content samples, enabling the machine learning models to have a reference for comparison. Furthermore, the system classifies and flags any MMS message that significantly deviates from any of the registered samples, ensuring compliance and preventing misuse.

The system interfaces with the CSP Registry API to fetch the latest campaign details, including registered message samples and use cases for each brand. This integration ensures that the ML model operates with up-to-date information, reflecting any changes or updates in the campaign registry. Furthermore, the system utilizes webhooks provided by the CSP Registry API for real-time notifications, such as campaign activation, updates, or deactivation. This immediate flow of information allows the system to dynamically adjust its monitoring and analysis based on current campaign statuses, ensuring that only active and relevant campaigns are under scrutiny.

The invention employs a ML model trained on a corpus of sample messages and/or message content provided by a brand to a registry to understand the nuances of natural language used in business messaging. By converting the content into vectors, the model captures semantic similarities and differences, enabling a comparison mechanism that extends beyond keyword matching or simple pattern recognition. Sample messages are submitted by the brand in the process of campaign registration. Some use cases require only 1 sample while others require up to five (5). The present invention, for exemplary purposes, uses five (5) sample messages in this specification but such sample size may vary according to the needs of the application and changing guidelines by the registry.

The angular distance between the incoming message vector and registered sample vectors serves as the basis for detecting deviations. A configurable threshold determines what constitutes a significant drift, allowing businesses to tailor the sensitivity of the detection to their specific needs. The operational workflow begins with an incoming message being checked against active campaigns from the CSP Registry API. The message is then converted into a vector and compared with the sample vectors of the corresponding registered campaign. If a significant drift is detected, the message is flagged for further action, which could include blocking the message, alerting the business, or reclassifying the message under a different, more appropriate use case based on its content.

This immediate response mechanism mitigates the risk of transmitting inappropriate or non-compliant content, thereby protecting the business's reputation and ensuring adherence to regulatory standards. Additionally, by identifying and reclassifying misaligned campaign messages, the system aids in rectifying fee discrepancies, ensuring businesses are charged correctly based on the actual use case of their messages. By integrating real-time analysis and compliance checks into the messaging workflow, the proposed system significantly reduces the risk of regulatory violations and financial penalties for businesses. It ensures that all messages sent under the guise of a registered campaign are in strict adherence to the campaign's declared use case and content guidelines.

The ability to detect and rectify campaign misuse in real-time represents a significant advancement over current practices, which largely rely on post-facto audits and manual reviews. This shift towards proactive monitoring and enforcement empowers carriers, businesses, and regulatory bodies to maintain higher standards of messaging practices, ultimately benefiting the end consumers through more relevant and compliant communications.

An embodiment of the invention includes a system designed for the detection of message drift within registered message campaigns. This system integrates a database interface and a processor among other components. The database interface is tasked with downloading campaign data from a messaging compliance registry (MCR) which is generic terminology for The Campaign Registry (TCR). The download includes identifiers such as the campaign identifier and use case identifier. These identifiers define the parameters and the approved content for the message campaign.

The processor accesses control vectors, which are derived from a sample array of string values for SMS messages. However, it should be noted as referenced previously that the inventive concept and process is applicable and enabled for multimedia content such as that transmitted as an MMS (multi-media service) message. Multimedia includes images, voice, music, video and any other audio and/or visual content. In the embodiment processing SMS messages, these values are representative of text communications intended for the message campaign, ensuring that messages adhering to the campaign's context are identified based on their proximity, in terms of angle, to this control vectors. The processor is capable of real-time analysis, deriving a numerical similarity score for new messages by calculating a new vector for each incoming message and comparing it against the control vectors. The similarity score reflects the degree of alignment; higher scores indicate closer alignment with the campaign's context, whereas lower scores signal deviation. In many cases, a plurality of sample messages are provided by the brand to the MCR. A control vector for each sample message is generated. The sample messages may have similar or different contextual content but they are in alignment with what is considered an approved communication for the brand's campaign by the MCR. Accordingly, an incoming message generally need only be in alignment with one or more of the sample messages to be considered compliant and not "drifted." Accordingly, where five (5) sample messages are approved by the MCR for the brand's campaign, there are a corresponding five (5) control vectors against which an incoming message is angularly compared. Thus, the vector representation for the incoming message is compared in an iterative process against the array of vector representations generated for the corresponding sample messages.

Upon analysis, the processor compiles an output containing the incoming message's identifier alongside the campaign identifier. This output is subsequently transmitted to a specified messaging authority. The output may also include additional data points, such as a value of the similarity score and a Boolean result that indicates whether the similarity score falls below a predetermined threshold value. In many cases, the iterative process described above may result in (for example) five similarity scores as the incoming message vector representation is compared against the vector representations for each of the MCR-approved sample messages. Embodiments of the invention may return all five similarity scores, return simply the highest similarity score or may return a Boolean result (true or false) as to whether the highest similarity score was above or below a threshold value. This threshold may be a constant indicative of whether message drift is detected or not. An advantage of returning a Boolean value is that is terse and efficient. Alternatively, returning the highest similarity score to another processing entity like the MCR allows that entity to make a more sophisticated evaluation of message compliance. For example, statistical processes like mean or median calculations for a time frame may provide a more granular understanding of whether a brand's campaign is compliant or drifting from their approved messaging context.

Actions taken by the messaging authority in response to the analysis can vary. They may include delaying the message's delivery, quarantining the message for further analysis, or other measures. The messaging authority itself could be any entity involved in message regulation or oversight, including but not limited to the MCR, a Mobile Network Operator (MNO), an SMS Gateway, or other relevant entities such as a netnumber Services Registry (nnSR), a campaign service provider (CSP), a connectivity network provider (CNP), or a direct connect aggregator (DCA).

The method for comparing vectors to derive the similarity score primarily employs cosine similarity measures, which are particularly well-suited for text comparisons. This is because cosine similarity focuses on measuring semantical similarity between documents, a feature that aligns closely with human perceptions.

However, beyond cosine similarity, there are various methods available for comparing vectors. One alternative is the Euclidean Distance, which measures the straight-line distance between two points in finite-dimensional space and is sensitive to the length of vectors. Another method, the Manhattan Distance, calculates the distance between two points by summing the absolute differences of their coordinates, reflecting the sum of horizontal and vertical components. Pearson Correlation provides a variant of cosine similarity whereas the Mahalanobis Distance generalizes the squared Euclidean distance. Each of these methods provides a different lens through which vector similarity can be assessed, allowing for flexibility regarding specific embodiments.

Furthermore, the creation of control vectors leverages transformer-based models (e.g. RoBERTa) ensuring a comprehensive and nuanced analysis of text communications against the campaign's standards. This allows the processor to not only include in the output array the highest similarity score but also use these vectors to propose better suited use cases in case of drift. Finally, the system is capable of generating an application programming interface (API) response for transmission back to the MCR. This response includes the incoming message's campaign identifier, message identifier, and the identified use case identifier, providing an overview of the message's compliance with the registered campaign's parameters.

BRIEF DESCRIPTION OF THE DRAWINGS

For a fuller understanding of the invention, reference should be made to the following detailed description, taken in connection with the accompanying drawings, in which:

FIG. 8 is exemplary JSON (JavaScript Object Notation) package suitable for an API post to the message compliance registry identifying a use case drift violation.

DETAILED DESCRIPTION OF THE PREFERRED EMBODIMENT

Figure 1:
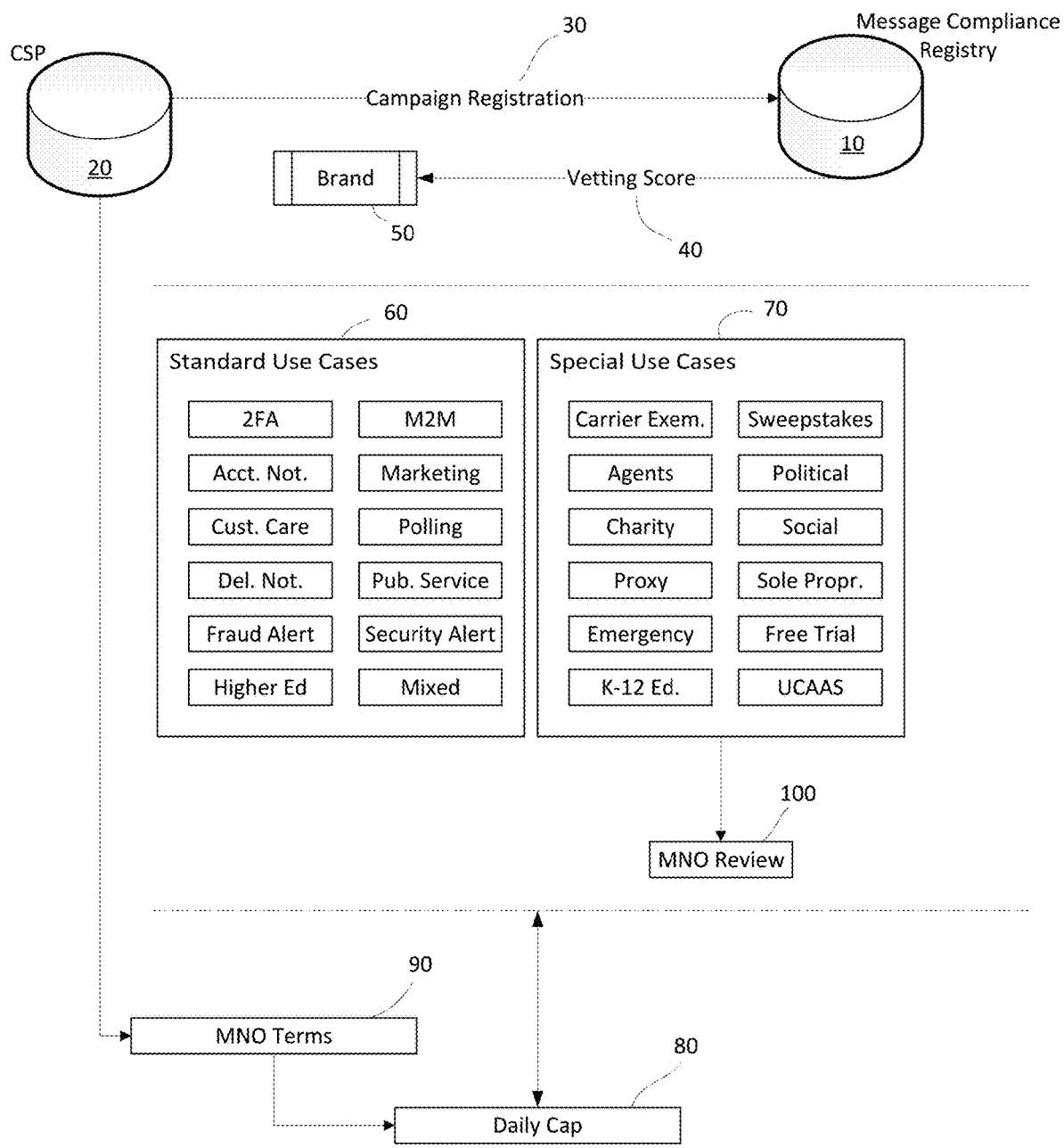
FIG. 1 is a diagrammatic overview of message compliance registration.

The general setup process for the Message Compliance Registry (MCR) 10 for SMS communications shown in FIG. 1 involves a Campaign Service Provider (CSP) 20 registering a campaign 30 for brand 50 and obtaining a brand vetting score 40, which assesses the brand's credibility and risk level. The CSP 20 then selects either a standard 60 or special use case 70 for the campaign 30, based on the nature and content of the intended messages. This selection, alongside the brand vetting score 40, influences the cost of the campaign and the allowed messaging activity 80 by the Mobile Network Operator (MNO). Higher vetting scores and standard use cases typically result in high daily message caps 80, lower costs and fewer restrictions (terms, 90), while special use cases may incur higher costs and stricter oversight 100.

Figure 2:
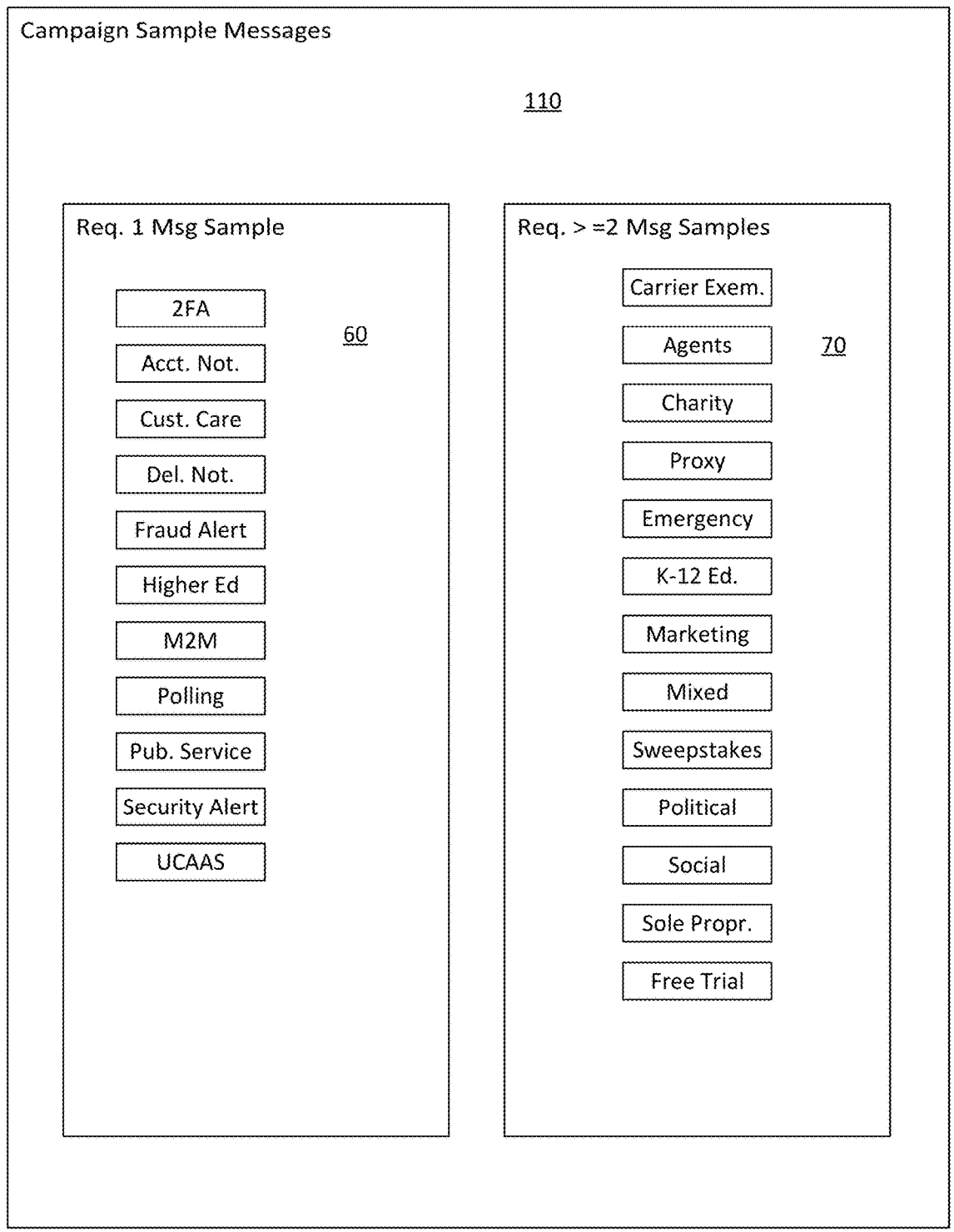
FIG. 2 is a diagrammatic view of sampling requirements for use cases in the context of message compliance registration.

As shown in FIG. 2, currently, MCRs require sample messages 110 during campaign registration. Typically, standard use cases 120 like 2-factor-authentication (2FA) only require submission of one message sample. However, most special use cases 70 require at least two sample messages. Some campaigns require up to five (5) sample messages.

Figure 3:
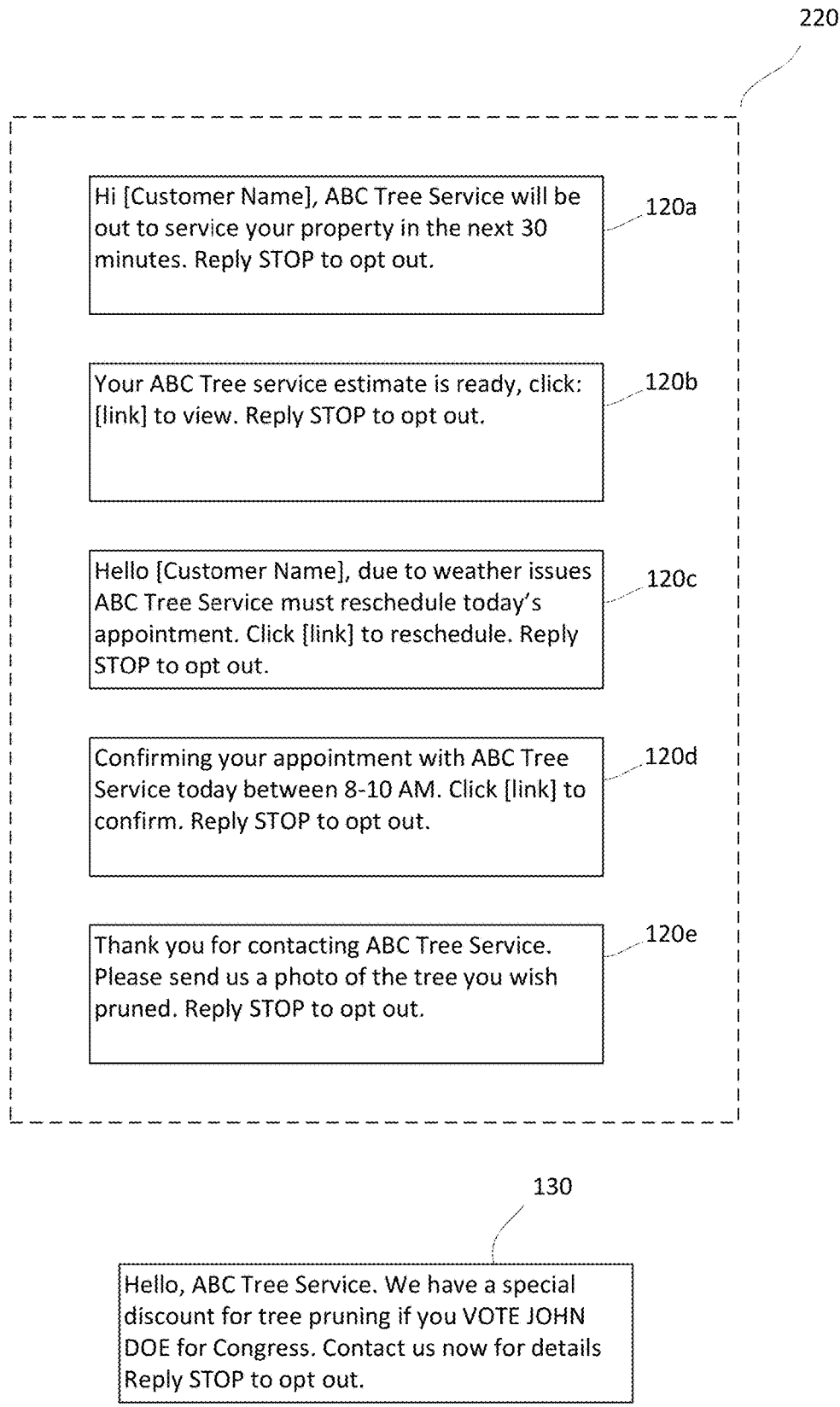
FIG. 3 is a diagrammatic view of exemplary message samples in the context of message compliance registration and an example of message drift.
Figure 4:
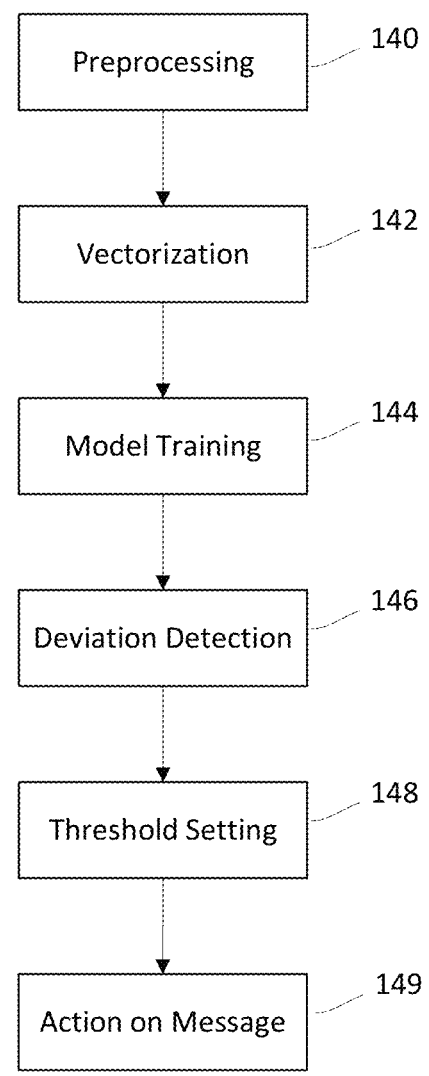
FIG. 4 is a diagrammatic view of the general process of detecting message drift.

In FIG. 3, five sample messages all relating to the use case of Customer Service are enumerated as string values 120a-e for a fictional arborist service. Sample message 120a relates to advance notice of an arrival. Sample message 120b relates to the availability of a job estimate. Sample message 120c relates to a weather-related rescheduling request. Sample message 120d is a variant of 120a relating to confirming an appointment time. Sample message 120e relates to requesting a photo of a tree to be serviced. However, a problem with the reliability, trustworthiness and abuse of the message system has been when a rogue message such as 130 is transmitted which contains both marketing and political messaging. These are in two different use cases, require different examination and may affect the cost and messaging limits. The general process of the present invention to address this issue is enumerated in FIG. 4 by the steps of preprocessing 140, vectorization 142, model training 144, deviation detection 146 and threshold settings 148.

Preprocessing Phase. Special characters and emojis present in SMS messages are processed during this phase. Depending on their relevance to the analysis, strategies may be implemented either to interpret these elements or to remove them from the dataset.

In the preprocessing phase for MMS message analysis, multimedia files such as images, audio, and video are initially processed to ensure uniformity. This includes resolution normalization, audio leveling, and frame rate standardization for video content. For images, preprocessing involves resizing, normalization, and possibly converting to grayscale to reduce complexity. Audio files undergo noise reduction and normalization to maintain consistent volume levels. Video content might be segmented into frames for image analysis and audio extraction for separate processing. Similar to text preprocessing, this phase ensures that multimedia content is in a suitable format for further analysis.

Vectorization. Vectorization 142 is the process of converting preprocessed text into vectors for text analysis, especially within the domain of natural language processing (NLP). This conversion enables mathematical operations on text data, facilitating subsequent analyses such as similarity measurement and anomaly detection. The state-of-the art technique of vectorization is based on the transformer technology.

In implementing vectorization, several preprocessing decisions impact the outcome, such as the dimension of the vector space and which languages should be supported. After vectorization, the vectors representing SMS messages can be used in various NLP tasks. These vectors serve as input for algorithms designed to classify messages, identify patterns, or measure similarities. By analyzing the distances or angles between vectors, it is possible to gauge the relatedness of messages, identify groups of similar messages, or detect messages that deviate significantly from typical patterns.

For MMS messaging, features from preprocessed multimedia content are extracted and converted into vectors. For images, this could involve extracting color histograms, texture patterns, or edge features. Audio files might be analyzed for spectral features, pitch, and tempo. Video analysis combines features from both image and audio processing. The extracted features are then converted into vectors, similar to the text vectorization process, enabling mathematical operations and comparisons.

Model Training. Model training 144 and deviation detection employ mathematical and statistical methods to analyze the content of messages. One such method is cosine similarity, which measures the degree of alignment between new messages and a baseline of sample messages. Cosine similarity quantifies the similarity between two vectors by calculating the cosine of the angle between them. For comparative SMS message analysis, each message is represented as a vector, with the dimensions of this vector corresponding to features extracted during the vectorization process. The cosine similarity between two message vectors ranges from −1 to 1, where 1 indicates identical directionality (and thus, high similarity), 0 indicates orthogonality (no similarity), and −1 indicates completely opposite meaning (maximum divergence). There are other alternatives for which the similarity only ranges between 0 to 1, i.e. there is no notion of opposite meaning.

To utilize cosine similarity for deviation detection, a system first establishes control vectors representing message samples for the specific brand. These control vectors in the vector space against which new messages can be compared. When a new SMS message is received, it undergoes preprocessing and vectorization to transform it into the same vector space as the control vectors. The cosine similarities between this new message vector and the baseline vectors are then calculated. If the similarity score falls below a predetermined threshold 148, this indicates that the new message significantly deviates from the norm established by the compliant messages. The threshold for determining significant deviation is typically set based on historical data, regulatory requirements, or specific organizational needs.

Model training for MMS involves using machine learning techniques to understand the normal range of variations within registered campaign samples. Control vectors are established for each type of media (image, audio, video) based on the registered samples provided by the brand. This baseline serves as a reference for comparing new MMS messages.

Deviation detection 146 using cosine similarity involves multiple steps and considerations. The method of vectorization directly impact the effectiveness of similarity measurement and the setting of the similarity threshold requires calibration. Too high a threshold may lead to false positives, where compliant messages against brand samples or within use cases are incorrectly flagged as deviant. Conversely, too low a threshold might result in false negatives, where non-compliant messages are not detected. This calibration may include statistical analysis and historical performance review. Deviation detection for MMS messages employs methods similar to those used in SMS analysis, such as calculating cosine similarity between vectors. However, this process is adapted for multimedia content. The system compares the vectors of new MMS content against the baseline vectors for images, audio, and video separately. If the similarity score falls below a predetermined threshold, this indicates significant deviation from the registered samples, flagging the message for review.

Additionally, the integration of deviation detection into broader compliance monitoring systems involves logistical and operational functions. For example, when a message is flagged as potentially non-compliant, the system may hold, quarantine, tag, or delay delivery of the message, coordinating such actions with the MNO, TCR and CSPs. This includes automated alerts, integration with case management systems, or escalation procedures for further investigation.

Once a significant deviation is detected in the analysis of SMS messages, the next step is the formulation and dispatch of a notification to the relevant parties (e.g., Action on Message 149), typically through a structured communication format such as JSON. This notification is crucial for informing stakeholders, such as Campaign Service Providers (CSPs), and Mobile Network Operators (MNOs), about potential issues requiring their attention, such as non-compliant messaging content or deviations from approved messaging campaigns. In this structured notification, properties such as CSP ID and CNP ID are included to identify the service providers involved. The CSP ID refers to the identity of the Campaign Service Provider, which is the entity responsible for sending the message or conducting the campaign. Meanwhile, the CNP ID represents the Connectivity Provider, which is involved in the delivery or routing of the message. These identifiers ensure that the notification is directed to and can be acted upon by the correct entities within the messaging ecosystem.

Brand information is another critical component of the payload. This includes the Brand ID, which uniquely identifies the brand under which the message was sent, and the Brand Name, providing a human-readable reference. These pieces of information link the message to a specific brand, facilitating easier tracking and management of messaging campaigns associated with that brand. Additionally, campaign identifiers such as the Campaign ID and Campaign Reference ID are included in the payload. These identifiers are crucial for linking the deviation to a specific messaging campaign, allowing for targeted investigation and remediation efforts. The Campaign ID is a unique identifier assigned to the campaign by the system, while the Campaign Reference ID is a secondary identifier that may be used internally or by external systems to reference the campaign. The specific event type, such as the string value of "MNO_CAMPAIGN_OPERATION_SUSPENDED," is a relevant piece of information that categorizes the nature of the deviation or issue being reported. This classification helps in triggering the appropriate response or workflow on the receiver's end, ensuring that the issue is addressed promptly and effectively.

Moreover, additional details may be included to provide further context or facilitate action, such as the Brand Reference ID, which is an internal identifier used by the brand creator, and the MNO ID and MNO Name, which specify the Mobile Network Operator involved. Including these details ensures that all parties have the necessary information to understand the scope and specifics of the issue.

The construction of the JSON payload is guided by a defined schema, which dictates the format, data types, and optional or mandatory status of each property. Adherence to this schema ensures that the payload is structured correctly and can be interpreted accurately by the receiving systems. This structured approach facilitates automated processing and response, enabling efficient resolution of issues and compliance with regulatory and operational requirements.

Figure 5:
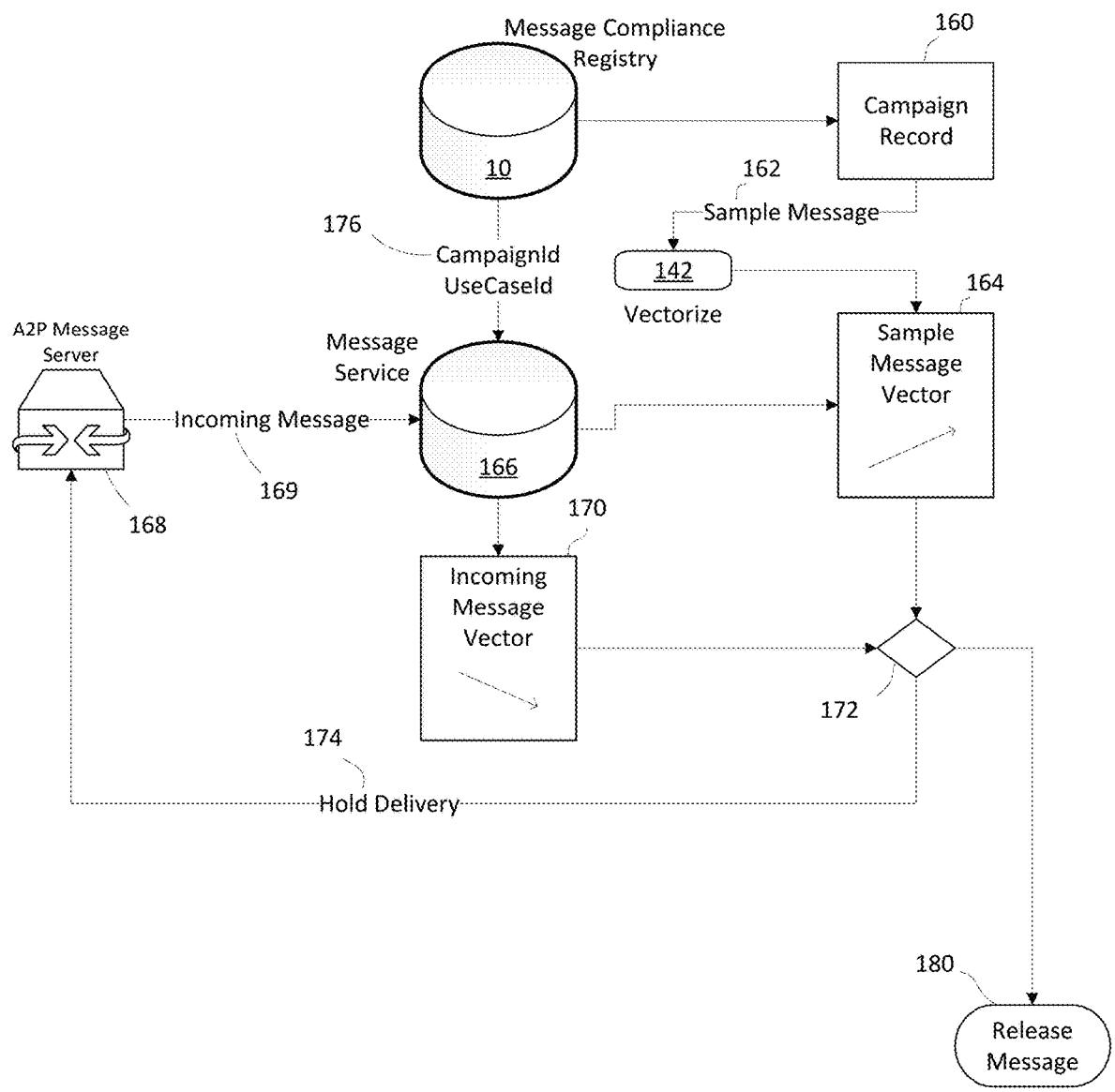
FIG. 5 is a diagrammatic view of an embodiment of the invention wherein message drift is detected for a text message, and the incoming message held accordingly.
Figure 6:
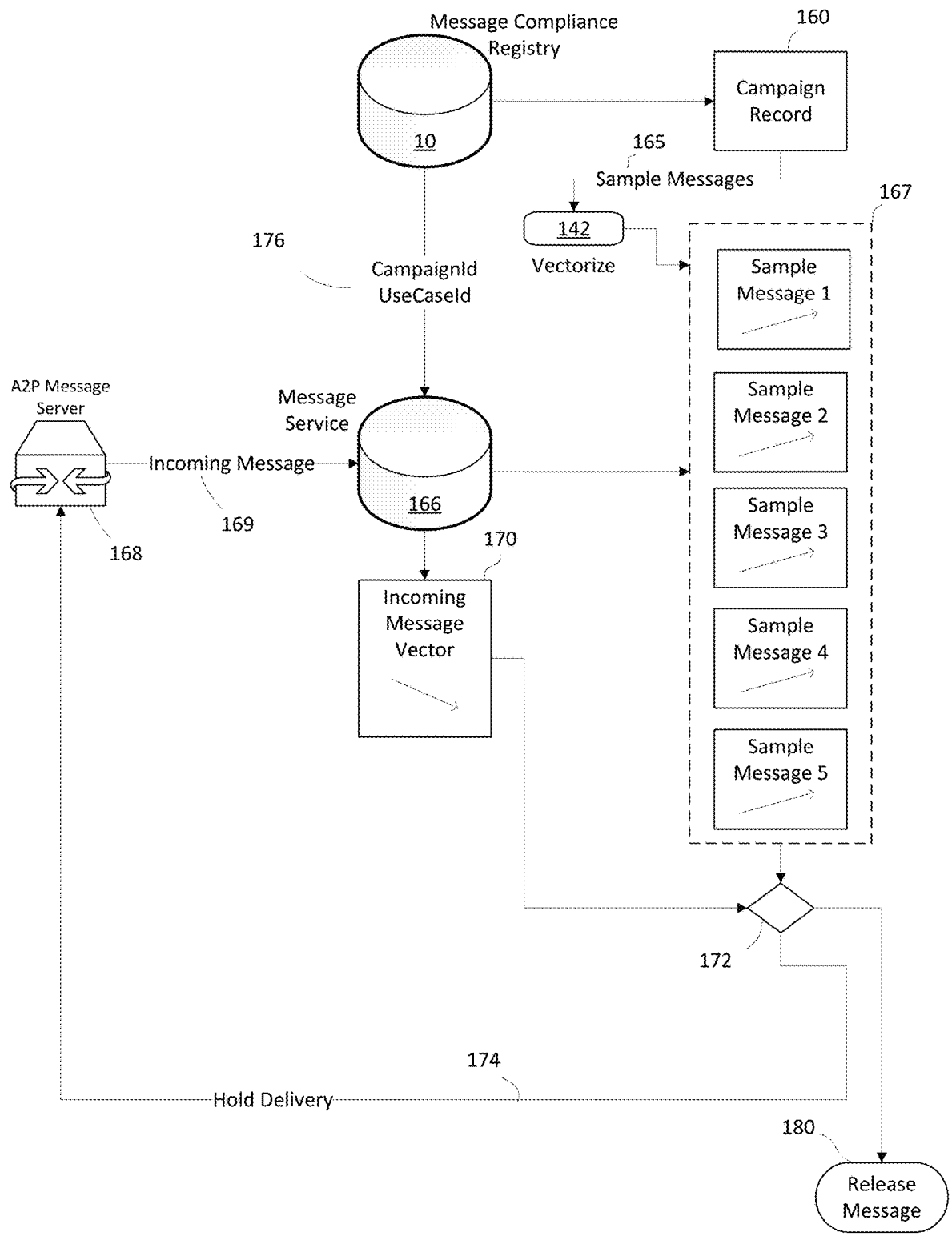
FIG. 6 is a diagrammatic view of an embodiment of the invention wherein message drift is detected for a text message by iterating over a plurality of sample message vector representations, and the incoming message held accordingly.

Referencing FIG. 5, the MCR 10 holds campaign record 160 which includes sample messages 162. These messages 162 are vectorized 142 after preprocessing 140. From the vectorization 142 sample message vectors 164 are generated. A2P message server 168 generates incoming message 169 intended for delivery to a person or device. However, message service 166 intercepts this message and generates an incoming message vector 170 which it compares 172 to the sample message vectors 164. If the incoming message vector 170 is sufficiently similar to one of the sample message vectors 164 then a release 180 of the message is permitted. However, if incoming message vector 170 deviates from all sample message vectors 164 then message service 166 provides instructions to tag or hold deliver 174 of incoming message. This could result in further analysis, delay of the message, deletion of the message or even a monetary charge for the deviation.

Samples messages 165 are vectorized 142. These vector representations 167 are used as controls against which a vectorized representation 170 of incoming message 169 is compared. A similarity score may be returned from each comparison between incoming message 169 and each message within the 167. Alternatively, a more terse output may be invoked by determining whether the highest similarity score falls above or below a threshold value and returning a Boolean result wherein a "true" value indicates a determination of message drift and a "false" value indicates a determination that no message drift was detected.

Figure 7:
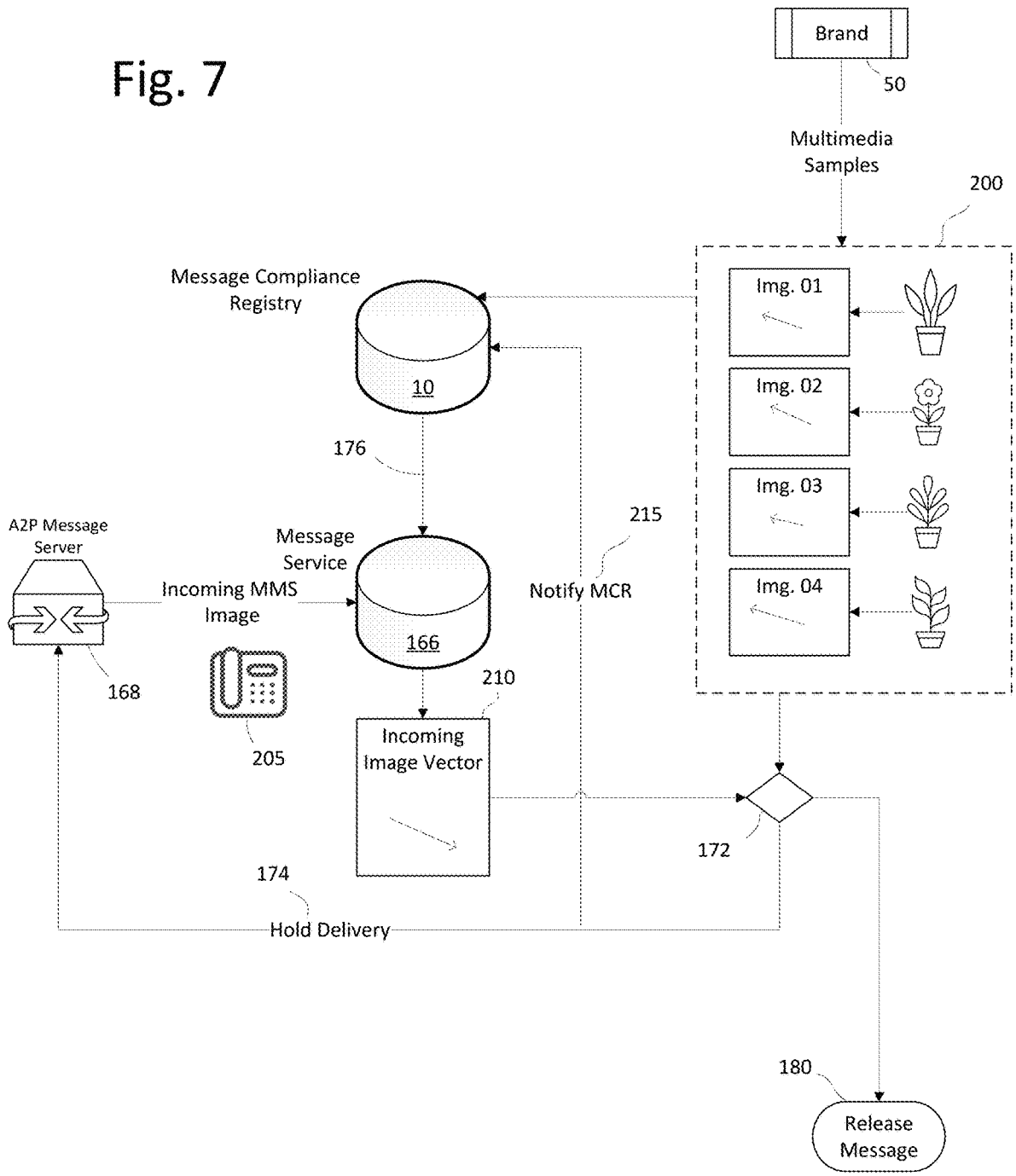
FIG. 7 is a diagrammatic view of an embodiment of the invention wherein message drift is detected for a message comprising an image.

An example implementation of the process is reproduced in the pseudocode below:

Input:
vectorization libraries, campaign samples, incoming message, threshold
Output:
vector incoming←vectorization of incoming message
  for sample in campaign samples
    control vector←vectorization of campaign sample
      if angle between vector incoming and control vector>threshold there is drift of incoming message to control vector end for
    incoming message has drift regarding the campaign if and only if it has drift to all samples of the campaign In FIG. 7, an alternative embodiment of the invention is shown where instead of text strings, brand 50 submits a collection 200 of multimedia samples, 1 mg. 01-04 for a flower delivery messaging campaign to MCR 10. These images are processed into a collection of vector representations 200. Against this collection 200, an incoming MMS message image 205 is made into vector representation 210 and this is compared against the collection 200 in step 172 to determine if the incoming MMS image 205 is sufficiently within the same context as the sample images 1 mg. 01-04 within collection 200. In this case, the incoming MMS image 205 is that of a telephone while collection 200 is constrained to various potted plant and flower images. Accordingly, step 172 returns a "true" Boolean value determining there is message drift because the highest similarity score for MMS image 205 against any of the vector representations in collection 200 fell under a threshold value. MCR 10 is notified 215 that drift exists and message service 166 may also send instructions 174 to other nodes such as A2P message server 168. It should be noted that substantially the same process enumerated in FIG. 7 may be applied to audio, video or any form of digital media.

FIG. 8 illustrates an exemplary JSON payload for conveying a detected message drift via an API path to an MNO, CSP, CNP, MCR, SMS Gateway or other entity in the message flow process.

Figure 9:
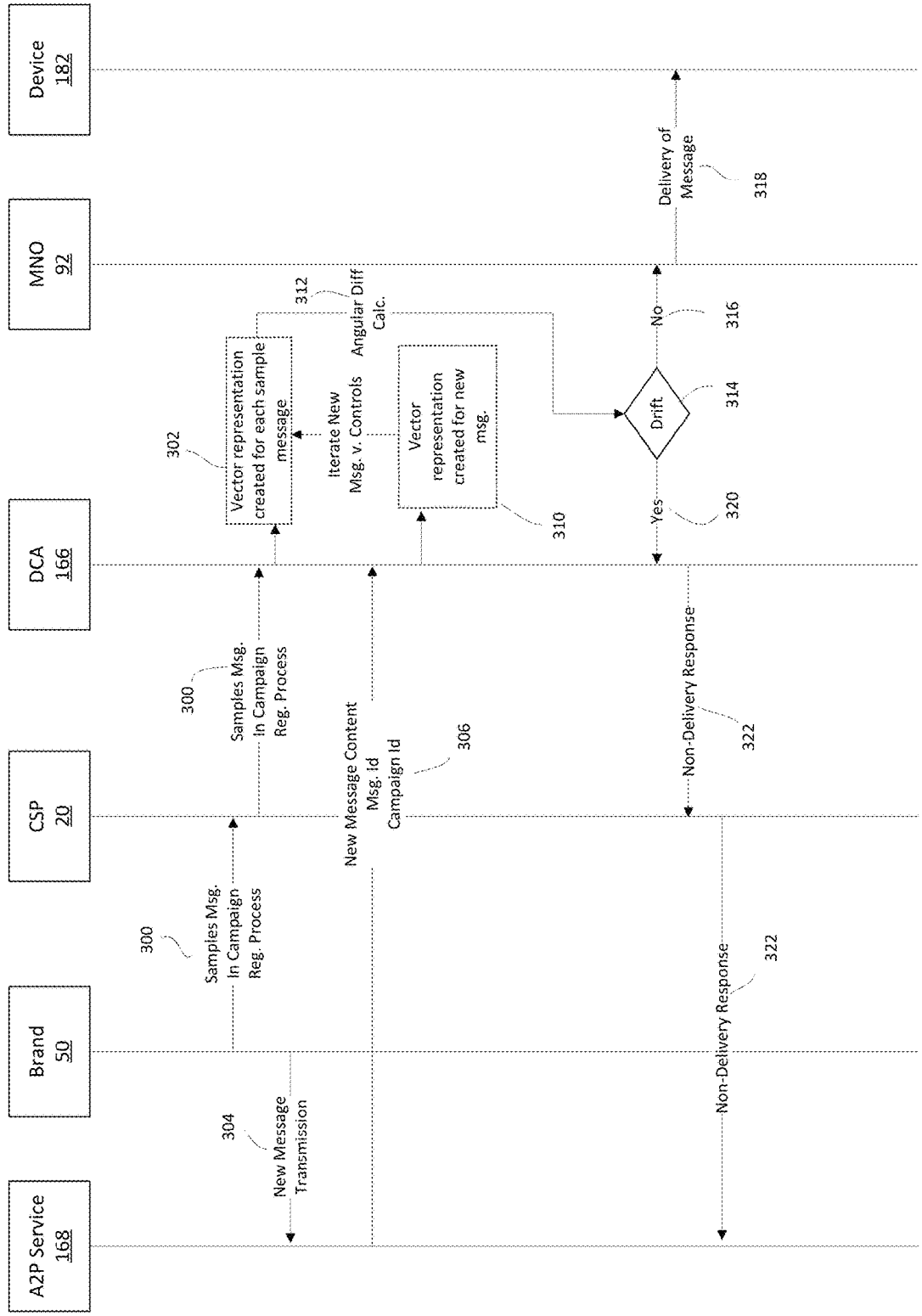
FIG. 9 is a flow diagram of an embodiment of the invention showing drift detection.

FIG. 9 illustrates an embodiment of the invention wherein Brand 50 submits a plurality of sample messages 300 in the processing of a campaign registration with MCR. CSP 20 facilitates this registration process sending the array of sample messages 300 to DCA 166 in this case but DCA 166 could be a separate entity and/or service for detecting drift. Also, the sample messages 300 may be text strings, multi-audio-visual media content or a combination thereof. In this embodiment, DCA 166 generates vector representations 302 for each individual sample message and stores each vector representation as a constant for later, performant analysis. A2P Service 168 receives a new message transmission 304 from Brand 50.

A2P Service 168 transmits New Message Content 306 along with a unique message identifier and the campaign identifier issued previously by the MCR. DCA 166 generates a vector representation 310 for New Message Content 306 and calculates the angular difference 312 by iterating the new message vector representation 310 against each individual sample message control within the collection of vector representations 302. A drift decision function is invoked 314. As all the sample messages are contextually approved by MCR for Brand 50's campaign, drift only exists if the context of New Message Content 306 fails to sufficient correlate to any single vector representation within the collection 302. As noted previously, various analysis mechanisms may be employed, one exemplary method is cosine similarity. A threshold similarity constant may be set by routine experimentation of what contextual similarity is permissible according to the MCR either overall or potentially in the context of specific use cases set for the Brand 50's campaign.

During the iterative process, the sample message vector representation with the lowest angular difference calculation 312 is used in the drift decision method. In an embodiment of the invention, if this lowest angular difference calculation 312 (or inversely, the highest similarity score) indicates the context of New Message Content 306 correlates with at least one of the approved sample messages 300 for Brand 50's campaign, then the New Message Content 306 is found not to drift 316 and delivery of the message 318 from MNO 92 to Device 182 is effectuated. Alternatively, if drift is detected 320, then DCA 166 sends a non-delivery response 322 to CSP 20 which is passed onto A2P Service 168. It should be cautioned that FIG. 9 is an exemplary arrangement of the messaging entities. The function for drift detecting may be injected at various points within the message flow to achieve substantially similar utility. As noted previously, embodiments of the invention may convey the returned results from drift detect back to additional entities, particularly the MCR which is a key authority in messaging integrity.

Additionally, it is anticipated that drift decision function 314 may return a Boolean (true/false) result but may alternative, or in conjunction return a message similarity value wherein the quantitative extent of drift may be returned to other messaging entities such as MNO 92, CSP 20, Brand 50, A2P Service 168 and MCR 10. Furthermore, it is also anticipated that drift decision function 314 may return tuples that may include the similarity score, a Boolean rule for the similarity score against a constant threshold value, a unique message identifier and a campaign identifier. These tuples may be conveyed into an information packet (e.g., JSON) for transmission to another messaging entity (typically, through an API POST command).

Computer and Software Technology

The present invention may be embodied on various platforms. The following provides an antecedent basis for the information technology that may be utilized to enable the invention.

Embodiments of the present invention may be implemented in hardware, firmware, software, or any combination thereof. Embodiments of the present invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The machine-readable medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device. Storage and services may be on premise or remote such as in the "cloud" through vendors operating under the brands MICROSOFT AZURE, AMAZON WEB SERVICES, RACKSPACE, and KAMATERA.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk or the like.

Program code embodied on a machine-readable medium may be transmitted using any appropriate medium, including but not limited to wireless, wire-line, optical fiber cable, radio frequency, etc., or any suitable combination of the foregoing. Machine-readable program code for carrying out operations for aspects of the present invention may be written in any combination of one or more programming languages, including an object-oriented programming language such as Java, C #, C++, Visual Basic or the like and conventional procedural programming languages, such as the "C" programming language or similar programming languages. Additional languages may include scripting languages such as PYTHON, LUA and PERL.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by machine-readable program instructions.

Glossary of Claim Terms

10DLC (10-digit Long Code): 10DLC means a standard 10-digit phone number used for commercial text messaging. Unlike short codes, which are typically 5-6 digits and used for mass messaging, 10DLCs allow businesses to send SMS from a number that appears more personal and less automated. Carriers have recently begun regulating 10DLCs for business use to ensure compliance with messaging standards and prevent spam.

Angular Distance: Angular Distance means a measure of similarity between two vectors in a vector space, often used in text analysis and machine learning. It is calculated based on the angle between two vectors, with smaller angles indicating greater similarity. In SMS monitoring, angular distance helps determine whether an incoming message closely aligns with registered campaign content.

A2P (Application-to-Person): A2P means the type of messaging where an application (typically a software program, not an individual) sends messages to a mobile user. This encompasses a wide range of services, from automated alerts, notifications from social media platforms, banking messages, to one-time passwords for user authentication. The A2P messaging framework is designed to facilitate bulk messaging services, primarily for businesses and organizations to communicate with customers or subscribers efficiently. In the context of the CSP Registry, A2P pertains specifically to the sanctioned use of 10-digit long codes (10DLC) for sending such business or organizational messages, ensuring compliance with mobile operators' standards and enhancing message deliverability and reliability. The registry's role includes managing the registration and oversight of A2P campaigns to maintain the integrity of this messaging ecosystem and to provide transparency for mobile carriers, thereby helping to uphold a trusted environment for consumers and businesses alike.

Compliance: Compliance means adherence to rules, regulations, and standards set by authorities or governing bodies. In SMS marketing, compliance involves following guidelines and requirements set by mobile carriers, regulatory agencies, and industry standards to prevent spam and ensure consumer protection.

CNP (Connectivity Network Provider): means an entity that facilitates the onboarding and operational connectivity of SMS campaigns to Mobile Network Operators (MNOs). The CNP plays an intermediary role between the Campaign Service Providers (CSPs) and the MNOs, ensuring that SMS campaigns are effectively integrated and compliant with network standards and regulations. The process begins with the CSP registering a brand and creating a campaign using the Campaign Builder Operations, which must adhere to specific use-cases and undergo brand vetting and, in some instances, require MNO approval. Once a campaign is registered and approved, indicated by TCR tracking and communicated via API calls or webhooks, the CSP can engage a CNP to share the campaign for further distribution. The CNP is responsible for assigning a unique phone number to the campaign, which serves as an identifier and point of contact for the SMS initiative. This assignment is critical for maintaining the integrity and traceability of the campaign across various network channels. The CNP's role extends to overseeing the campaign's lifecycle within the network, ensuring that it meets the operational standards and compliance requirements of the participating MNO networks. At the end of a campaign's lifecycle, the CSP has the option to cancel auto-renewal or deactivate the campaign, a process managed and facilitated by the CNP to ensure a smooth transition and proper closure within the network's operational parameters.

CSP (Campaign Service Provider): CSP means an entity or platform that facilitates the creation, registration, and management of SMS marketing campaigns for businesses. CSPs interface with The Campaign Registry and mobile carriers to ensure that campaigns comply with regulatory standards and best practices. They provide tools and services for businesses to manage their SMS campaigns effectively.

DCA (Direct Connect Aggregator): DCA means a company that establishes a direct connection to a Mobile Network Operator's (MNO) Gateway. DCAs serve as intermediaries that facilitate the transmission of messages on behalf of their customers, ensuring that SMS campaigns reach their intended audiences. They play a crucial role in the messaging ecosystem by bridging the gap between businesses (or CSPs) and MNOs, enabling efficient and reliable message delivery.

Drift Detection: Drift Detection means the process of identifying significant changes or deviations in data streams or patterns over time. In the context of SMS campaigns, it refers to the automated detection of messages that significantly deviate from the registered campaign samples, indicating potential misuse or non-compliance.

Fee Structure: Fee Structure means the pricing model or scheme determined by service providers, such as mobile carriers or CSPs, for the use of services like SMS campaigning. The structure may vary based on factors like message volume, campaign type, and regulatory compliance, affecting the overall cost of conducting SMS marketing campaigns.

ML (Machine Learning): ML means a subset of artificial intelligence focused on building systems that learn from data. In the context of SMS campaigns, machine learning models can analyze text messages to identify patterns, classify content, and detect deviations from registered campaign samples. ML enables automated, real-time decision-making based on data analysis.

MNO (Mobile Network Operator): MNO means the telecommunications service provider that offers wireless communication services to end-users. MNOs own or control the necessary infrastructure to provide services to mobile phone subscribers, including network infrastructure and spectrum allocation. In the context of A2P messaging, MNOs are responsible for delivering SMS messages from businesses to consumers, ensuring network security, and compliance with regulatory standards.

NNID (Network Node Identifier): NNID refers to a unique identifier used within telecommunications networks to specify nodes or points within the network infrastructure. It is crucial for routing messages and calls correctly within and between networks, ensuring accurate and efficient delivery of services.

nnSR (netnumber Services Registry): Industry database whereby routing information are registered, distributed and managed for optimal network performance and service discovery.

Brand: In the context of the Campaign Registry, a Brand refers to a company or entity that initiates A2P SMS campaigns. Brands are required to register with The Campaign Registry to send messages, ensuring transparency and compliance with carrier regulations.

Standard Campaigns: Standard Campaigns are types of SMS campaigns that are generally available to all TCR-registered Brands and do not require pre/post-registration approval from Mobile Network Operators (MNOs). These campaigns follow predefined use cases with established guidelines and are automatically approved upon completion of the registration form.

Special Campaigns: Special Campaigns refer to SMS campaigns that are sensitive or critical in nature and may require pre/post-registration approval by MNOs. These campaigns are subject to additional scrutiny, such as vetting or MNO approval, before a Brand can register and launch them due to their potential impact or the nature of the content being sent.

SMS (Short Message Service): SMS means a text messaging service component of most telephone, internet, and mobile device systems. It uses standardized communication protocols to enable mobile devices to exchange short text messages. An SMS message can contain up to 160 characters, including spaces, punctuation, and the actual text. SMS is widely used for various purposes, including personal communication, business marketing, and transactional messages.

SMS Campaign Registry means a centralized database that manages the registration and oversight of SMS messaging campaigns, ensuring compliance with mobile carriers' policies and regulations. It requires businesses to register their SMS campaigns by providing details such as the campaign's purpose, sample messages, and sender identification. This registry helps prevent spam and abuse by verifying that the content and intent of SMS campaigns align with declared use cases. It enables carriers to monitor and enforce compliance, ensuring that messages reaching consumers are legitimate, reducing unwanted spam, and maintaining the integrity of SMS communication channels.

TCR (The Campaign Registry): TCR means the centralized hub for registering messaging campaigns as required by mobile carriers. It serves as a repository for campaign details, including use cases, message samples, and brand information. TCR works in conjunction with CSPs and carriers to maintain the integrity and compliance of business SMS communications.

Vector Space Representation: Vector Space Representation means a method in machine learning where text (such as SMS messages), images and audio are converted into vectors in a finite-dimensional space. This representation allows for the quantitative comparison of texts based on their semantic similarity. In SMS campaign monitoring, it enables the detection of deviations from registered message content by measuring the distance or angle between vectors.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

What is claimed is:

1. A system for detecting message drift in a registered message campaign, comprising:
   a database interface configured to download campaign data from a messaging compliance registry (MCR) for the registered message campaign, the campaign data including at least a campaign identifier;
   a processor configured to:
   access a control vector derived from a sample text communication submitted to the registered message campaign, wherein contextually analogous messages are represented by vectors having a lower angle from the control vector representation and contextually non-analogous messages are represented by vectors having a higher angle from the control vector representation;
   derive, in real-time, a similarity score for a new vector calculated for an incoming message against the control vector wherein contextually analogous messages represented by vectors with the lower angle relative to non-analogous messages result in a higher similarity score and contextually non-analogous messages represented by vectors with the higher angle relative to analogous messages result in a lower similarity score;
   process the similarity score into an output; and
   transmit to a messaging authority the output, the output based on the similarity score.

2. The system of claim 1 wherein the output transmitted to the messaging authority further includes an identifier for the incoming message.

3. The system of claim 1 wherein the output transmitted to the messaging authority further includes a campaign identifier associated with the incoming message.

4. The system of claim 1 wherein a plurality of control vectors are derived from a corresponding plurality of sample text communications submitted to the registered message campaign, the processor further configured to derive, in real-time, a similarity score for each of the control vectors.

5. The system of claim 4 wherein the output includes returning the highest similarity score to the messaging authority.

6. The system of claim 5 wherein the output includes a Boolean result responsive to finding the highest similarity score for the incoming message falls above or below a threshold value.

7. The system of claim 1 wherein the output includes a numeric value for the similarity score.

8. The system of claim 1 wherein the output includes a Boolean result responsive to finding the similarity score for the incoming message falls or below a threshold value.

9. The system of claim 1 wherein the messaging authority delays the delivery of the incoming message to a destination.

10. The system of claim 1 wherein the messaging authority quarantines the incoming message for additional analysis.

11. The system of claim 1 wherein the messaging authority is selected from the group consisting of the MCR, a mobile network operator (MNO), an SMS Gateway, a netnumber Services Registry (nnSR), a campaign service provider (CSP), a connectivity network provider (CNP) and a direct connect aggregator (DCA).

12. The system of claim 1 wherein comparing the angle between vectors used to derive the similarity score employs cosine similarity measures.

13. A system for detecting message drift in a registered message campaign, comprising:
a database interface configured to download campaign data from a messaging compliance registry (MCR) for the registered message campaign, the campaign data including at least a campaign identifier;
a processor configured to:
access a control vector derived from a sample media file submitted to the registered message campaign, wherein contextually analogous media files are represented by vectors having a lower angle from the control vector representation and contextually non-analogous media files are represented by vectors having a higher angle from the control vector representation;
derive, in real-time, a similarity score for a new vector calculated for an incoming media file contained within an incoming message against the control vector wherein contextually analogous media file represented by vectors with the lower angle relative to non-analogous media files result in a higher similarity score and contextually non-analogous media files represented by vectors with the higher angle relative to analogous media files result in a lower similarity score;
process the similarity score into an output; and
transmit to a messaging authority the output, the output based on the similarity score.

14. The system of claim 13 wherein the output transmitted to the messaging authority further includes an identifier for the incoming message.

15. The system of claim 13 wherein the output transmitted to the messaging authority further includes a campaign identifier associated with the incoming message.

16. The system of claim 13 wherein a plurality of control vectors are derived from a corresponding plurality of sample media files submitted to the registered message campaign, the processor further configured to derive, in real-time, a similarity score for each of the control vectors.

17. The system of claim 16 wherein the output includes the highest similarity score.

18. The system of claim 17 wherein the output includes a Boolean result responsive to finding the highest similarity score for the incoming media file falls above or below a threshold value.

19. The system of claim 13 wherein the output includes a Boolean result responsive to finding the similarity score for the incoming media file falls above or below a threshold value.

20. The system of claim 13 wherein the output includes a numeric value for the similarity score.

21. The system of claim 13 wherein the messaging authority delays the delivery of the incoming message to a destination.

22. The system of claim 13 wherein the messaging authority quarantines the incoming message for additional analysis.

23. The system of claim 13 wherein the messaging authority is selected from the group consisting of the MCR, a mobile network operator (MNO), an SMS Gateway, a netnumber Services Registry (nnSR), a campaign service provider (CSP), a connectivity network provider (CNP) and a direct connect aggregator (DCA).

24. The system of claim 13 wherein comparing the angle between vectors used to derive the similarity score employs cosine similarity measures.

25. The system of claim 13 wherein the media file is of a type selected from the group consisting of digitized images, video and audio.

26. A system for detecting message drift in a registered message campaign, comprising:
a database interface configured to download campaign data from a messaging compliance registry (MCR) for the registered message campaign, the campaign data including at least a campaign identifier and plurality of sample message content items previously submitted to the MCR;
a processor configured to:
generate a plurality of control vector representations derived for each individual sample message content item in the plurality of sample message content items, each individual control vector representation corresponding to an associated sample message content item;
derive, in real-time, a similarity score for a new vector representation calculated for an incoming message against the control vector representation wherein contextually analogous messages have vector representations with a lower angle relative to non-analogous messages and result in a higher similarity score and contextually non-analogous messages have vector representations with a higher angle relative to analogous messages and result in a lower similarity score;
process the similarity score into an output; and
transmit to a messaging authority the output, the output based on the similarity score.

* * * * *